A

| C1 | C2 | C3 | C4 | C5 | C6 | C7 | C8 | C9 | C10 | C11 | C12 |
|---|---|---|---|---|---|---|---|---|---|---|---|
| x | d1 | d2 | d3 | d4 | d5 | PRES. STATE | D1 | D2 | D3 | D4 | D5 |
| 0 | 0 | 1 | 0 | 0 | 0 | 1 | 0 | 0 | 1 | 0 | 0 |
| 0 | 0 | 0 | 1 | 0 | 0 | 2 | 0 | 0 | 0 | 1 | 0 |
| 0 | 0 | 0 | 0 | 1 | 0 | 3 | 0 | 0 | 0 | 0 | 1 |
| 0 | 0 | 0 | 0 | 0 | 1 | 4 | 1 | 0 | 0 | 0 | 0 |
| 1 | 1 | 0 | 0 | 0 | 0 | 5 | 1 | 1 | 0 | 0 | 0 |
| 1 | 1 | 1 | 0 | 0 | 0 | 6 | 1 | 1 | 1 | 0 | 0 |
| 1 | 1 | 1 | 1 | 0 | 0 | 7 | 1 | 1 | 1 | 1 | 0 |
| 1 | 1 | 1 | 1 | 1 | 0 | 8 | 1 | 1 | 1 | 1 | 1 |
| 1 | 1 | 1 | 1 | 1 | 1 | 9 | 0 | 1 | 1 | 1 | 1 |
| 0 | 0 | 1 | 1 | 1 | 1 | 10 | 1 | 0 | 1 | 1 | 1 |
| 1 | 1 | 0 | 1 | 1 | 1 | 11 | 0 | 1 | 0 | 1 | 1 |
| 0 | 0 | 1 | 0 | 1 | 1 | 12 | 1 | 0 | 1 | 0 | 1 |
| 1 | 1 | 0 | 1 | 0 | 1 | 13 | 0 | 1 | 0 | 1 | 0 |
| 0 | 0 | 1 | 0 | 1 | 0 | 14 | 0 | 0 | 1 | 0 | 1 |
| 0 | 0 | 0 | 1 | 0 | 1 | 15 | 1 | 0 | 0 | 1 | 0 |
| 1 | 1 | 0 | 0 | 1 | 0 | 16 | 1 | 1 | 0 | 0 | 1 |
| 1 | 1 | 1 | 0 | 0 | 1 | 17 | 0 | 1 | 1 | 0 | 0 |
| 0 | 0 | 1 | 1 | 0 | 0 | 18 | 0 | 0 | 1 | 1 | 0 |
| 0 | 0 | 0 | 1 | 1 | 0 | 19 | 0 | 0 | 0 | 1 | 1 |
| 0 | 0 | 0 | 0 | 1 | 1 | 20 | 1 | 0 | 0 | 0 | 1 |
| 1 | 1 | 0 | 0 | 0 | 1 | 21 | 0 | 1 | 0 | 0 | 0 |
| UNUSED STATES | | | | | | | | | | | |
| 0 | 0 | 0 | 1 | 1 | 1 | | Ø | Ø | Ø | Ø | Ø |
| 0 | 0 | 1 | 0 | 0 | 1 | | | | | | |
| 0 | 0 | 1 | 1 | 1 | 0 | | | | | | |
| 0 | 1 | 0 | 0 | 1 | 1 | | | | | | |
| 0 | 1 | 0 | 1 | 0 | 0 | | | | | | |
| 0 | 1 | 1 | 0 | 1 | 0 | | | | | | |
| 0 | 1 | 1 | 1 | 0 | 1 | | | | | | |

B

| C13 | C14 | C15 | C16 | C17 | C18 | C19 | C20 | C21 | C22 | C23 |
|---|---|---|---|---|---|---|---|---|---|---|
| x | d1 | d2 | d3 | d4 | d5 | D1 | D2 | D3 | D4 | D5 |
| 1 | 0 | 1 | 0 | 0 | 0 | 0 | 1 | 0 | 0 | 0 |
| 1 | 0 | 0 | 1 | 0 | 0 | 0 | 1 | 0 | 0 | 0 |
| 1 | 0 | 0 | 0 | 1 | 0 | 0 | 1 | 0 | 0 | 0 |
| 1 | 0 | 0 | 0 | 0 | 1 | 0 | 1 | 0 | 0 | 0 |
| 0 | 1 | 0 | 0 | 0 | 0 | 1 | 0 | 0 | 0 | 0 |
| 0 | 1 | 1 | 0 | 0 | 0 | 0 | 0 | 1 | 0 | 0 |
| 0 | 1 | 1 | 1 | 0 | 0 | 0 | 0 | 1 | 0 | 0 |
| 0 | 1 | 1 | 1 | 1 | 0 | 0 | 0 | 1 | 0 | 0 |
| 0 | 1 | 1 | 1 | 1 | 1 | 0 | 0 | 1 | 0 | 0 |
| 1 | 0 | 1 | 1 | 1 | 1 | 0 | 1 | 0 | 0 | 0 |
| 0 | 1 | 0 | 1 | 1 | 1 | 0 | 0 | 0 | 1 | 0 |
| 1 | 0 | 1 | 0 | 1 | 1 | 0 | 1 | 0 | 0 | 0 |
| 0 | 1 | 0 | 1 | 0 | 1 | 0 | 0 | 0 | 1 | 0 |
| 1 | 0 | 1 | 0 | 1 | 0 | 0 | 1 | 0 | 0 | 0 |
| 1 | 0 | 0 | 1 | 0 | 1 | 0 | 1 | 0 | 0 | 0 |
| 0 | 1 | 0 | 0 | 1 | 0 | 0 | 0 | 0 | 0 | 1 |
| 0 | 1 | 1 | 0 | 0 | 1 | 0 | 0 | 1 | 0 | 0 |
| 1 | 0 | 1 | 1 | 0 | 0 | 0 | 1 | 0 | 0 | 0 |
| 1 | 0 | 0 | 1 | 1 | 0 | 0 | 1 | 0 | 0 | 0 |
| 1 | 0 | 0 | 0 | 1 | 1 | 0 | 1 | 0 | 0 | 0 |
| 0 | 1 | 0 | 0 | 0 | 1 | 1 | 0 | 0 | 0 | 0 |
| UNUSED STATES | | | | | | | | | | |
| 1 | 0 | 0 | 1 | 1 | 1 | Ø | Ø | Ø | Ø | Ø |
| 1 | 0 | 1 | 0 | 0 | 1 | | | | | |
| 1 | 0 | 1 | 1 | 1 | 0 | | | | | |
| 1 | 1 | 0 | 0 | 1 | 1 | | | | | |
| 1 | 1 | 0 | 1 | 0 | 0 | | | | | |
| 1 | 1 | 1 | 0 | 1 | 0 | | | | | |
| 1 | 1 | 1 | 1 | 0 | 1 | | | | | |

FIG. 6

INVENTOR.
MARVIN PERLMAN
BY
ATTORNEYS

Feb. 3, 1970 JAMES E. WEBB 3,493,929
ADMINISTRATOR OF THE NATIONAL AERONAUTICS
AND SPACE ADMINISTRATION
BINARY SEQUENCE DETECTOR
Filed Sept. 9, 1966 4 Sheets-Sheet 1
| | X | C1 | C2 | C3 | C4 |
|---|---|---|---|---|---|
| R1 | 1 | 0 | 1 | 1 | 1 |
| R2 | 1 | 1 | 0 | 1 | 1 |
| R3 | 1 | 0 | 1 | 0 | 1 |
| R4 | 0 | 0 | 0 | 1 | 0 |
| R5 | 1 | 1 | 0 | 0 | 1 |
| R6 | 0 | 0 | 1 | 0 | 0 |
| R7 | 0 | 1 | 0 | 1 | 0 |
| R8 | 1 | 1 | 1 | 0 | 1 |
| R9 | 0 | 1 | 1 | 1 | 0 |
FIG. 1
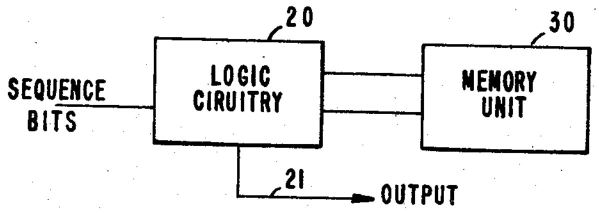
FIG. 2
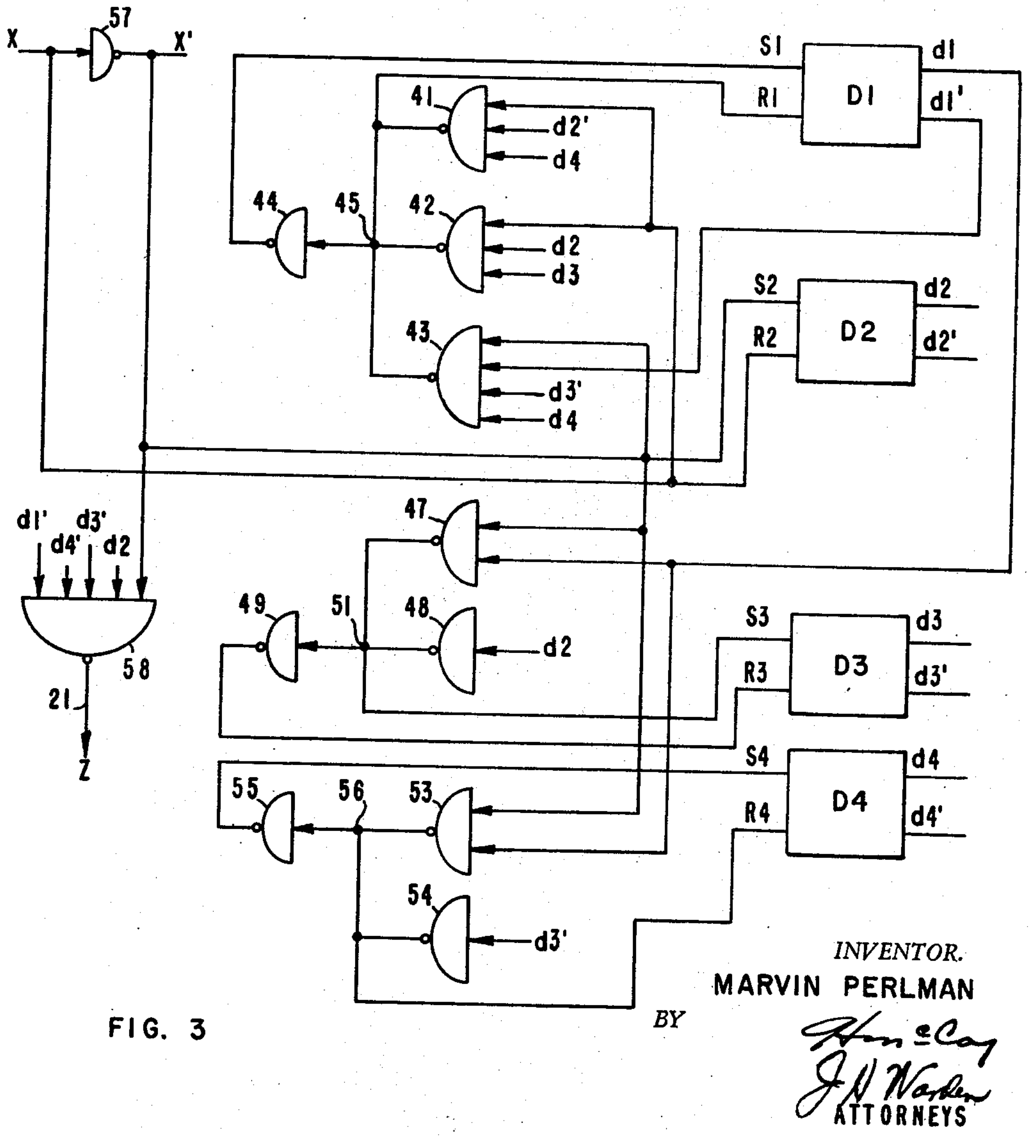
FIG. 3
INVENTOR.
MARVIN PERLMAN
BY
ATTORNEYS

| | X | d1 | d2 | d3 | d4 | PRESENT STATE | D1 | D2 | D3 | D4 | NEXT STATE |
|---|---|---|---|---|---|---|---|---|---|---|---|
| R1 | 1 | 1 | 0 | 1 | 0 | 1 | 1 | 1 | 0 | 1 | 2 |
| R2 | 1 | 1 | 1 | 0 | 1 | 2 | 1 | 1 | 1 | 0 | 3 |
| R3 | 1 | 1 | 1 | 1 | 0 | 3 | 0 | 1 | 1 | 1 | 4 |
| R4 | 0 | 0 | 1 | 1 | 1 | 4 | 1 | 0 | 1 | 1 | 5 |
| R5 | 1 | 1 | 0 | 1 | 1 | 5 | 0 | 1 | 0 | 1 | 6 |
| R6 | 0 | 0 | 1 | 0 | 1 | 6 | 0 | 0 | 1 | 0 | 7 |
| R7 | 0 | 0 | 0 | 1 | 0 | 7 | 1 | 0 | 0 | 1 | 8 |
| R8 | 1 | 1 | 0 | 0 | 1 | 8 | 0 | 1 | 0 | 0 | 9 |
| R9 | 0 | 0 | 1 | 0 | 0 | 9 | 1 | 0 | 1 | 0 | 1 |
| R10 | 0 | 1 | 0 | 1 | 0 | 1 | 1 | 0 | 1 | 0 | 1 |
| R11 | 0 | 1 | 1 | 0 | 1 | 2 | 1 | 0 | 1 | 0 | 1 |
| R12 | 0 | 1 | 1 | 1 | 0 | 3 | 1 | 0 | 1 | 0 | 1 |
| R13 | 1 | 0 | 1 | 1 | 1 | 4 | 0 | 1 | 1 | 1 | 4 |
| R14 | 0 | 1 | 0 | 1 | 1 | 5 | 1 | 0 | 1 | 0 | 1 |
| R15 | 1 | 0 | 1 | 0 | 1 | 6 | 1 | 1 | 1 | 0 | 3 |
| R16 | 1 | 0 | 0 | 1 | 0 | 7 | 1 | 1 | 0 | 1 | 2 |
| R17 | 0 | 1 | 0 | 0 | 1 | 8 | 1 | 0 | 1 | 0 | 1 |
| R18 | 1 | 0 | 1 | 0 | 0 | 9 | 1 | 1 | 1 | 0 | 3 |

UNUSED STATES

| | | | | | | | | |
|---|---|---|---|---|---|---|---|---|
| 0 | 0 | 0 | 0 | 0 | Ø | Ø | Ø | Ø |
| 0 | 0 | 0 | 0 | 1 | ↓ | ↓ | ↓ | ↓ |
| 0 | 0 | 0 | 1 | 1 | ↓ | ↓ | ↓ | ↓ |
| 0 | 0 | 1 | 1 | 0 | ↓ | ↓ | ↓ | ↓ |
| 0 | 1 | 0 | 0 | 0 | ↓ | ↓ | ↓ | ↓ |
| 0 | 1 | 1 | 0 | 0 | ↓ | ↓ | ↓ | ↓ |
| 0 | 1 | 1 | 1 | 1 | ↓ | ↓ | ↓ | ↓ |
| 1 | 0 | 0 | 0 | 0 | ↓ | ↓ | ↓ | ↓ |
| 1 | 0 | 0 | 0 | 1 | ↓ | ↓ | ↓ | ↓ |
| 1 | 0 | 0 | 1 | 1 | ↓ | ↓ | ↓ | ↓ |
| 1 | 0 | 1 | 1 | 0 | ↓ | ↓ | ↓ | ↓ |
| 1 | 1 | 0 | 0 | 0 | ↓ | ↓ | ↓ | ↓ |
| 1 | 1 | 1 | 0 | 0 | ↓ | ↓ | ↓ | ↓ |
| 1 | 1 | 1 | 1 | 1 | ↓ | ↓ | ↓ | ↓ |

FIG. 4

| X | D1 | D2 | D3 | D4 | D5 | ASSIGNED STATE |
|---|---|---|---|---|---|---|
| 0 | 1 | 0 | 0 | 0 | 0 | 5 |
| 0 | 1 | 1 | 0 | 0 | 0 | 6 |
| 0 | 1 | 1 | 1 | 0 | 0 | 7 |
| 0 | 1 | 1 | 1 | 1 | 0 | 8 |
| 1 | 1 | 1 | 1 | 1 | 1 | 9 |
| 1 | 0 | 1 | 1 | 1 | 1 | 10 |
| 1 | 1 | 0 | 1 | 1 | 1 | 11 |
| 1 | 0 | 1 | 0 | 1 | 1 | 12 |
| 1 | 1 | 0 | 1 | 0 | 1 | 13 |
| 0 | 0 | 1 | 0 | 1 | 0 | 14 |
| 1 | 0 | 0 | 1 | 0 | 1 | 15 |
| 0 | 1 | 0 | 0 | 1 | 0 | 16 |
| 1 | 1 | 1 | 0 | 0 | 1 | 17 |
| 0 | 0 | 1 | 1 | 0 | 0 | 18 |
| 0 | 0 | 0 | 1 | 1 | 0 | 19 |
| 1 | 0 | 0 | 0 | 1 | 1 | 20 |
| 1 | 1 | 0 | 0 | 0 | 1 | 21 |
| 0 | 0 | 1 | 0 | 0 | 0 | 1 |
| 0 | 0 | 0 | 1 | 0 | 0 | 2 |
| 0 | 0 | 0 | 0 | 1 | 0 | 3 |
| 1 | 0 | 0 | 0 | 0 | 1 | 4 |

FIG. 5

*INVENTOR.*
MARVIN PERLMAN
*BY* [signatures]
ATTORNEYS

Feb. 3, 1970 JAMES E. WEBB 3,493,929
ADMINISTRATOR OF THE NATIONAL AERONAUTICS
AND SPACE ADMINISTRATION
BINARY SEQUENCE DETECTOR
Filed Sept. 9, 1966 4 Sheets-Sheet 4

INVENTOR.
MARVIN PERLMAN
BY
ATTORNEYS

United States Patent Office 3,493,929

Patented Feb. 3, 1970

3,493,929

BINARY SEQUENCE DETECTOR

James E. Webb, Administrator of the National Aeronautics and Space Administration, with respect to an invention of Marvin Perlman, Granada Hills, Calif.

Filed Sept. 9, 1966, Ser. No. 578,932

Int. Cl. G08c *9/00;* G08b *29/00;* G06k *21/00*

U.S. Cl. 340—146.2 8 Claims

ABSTRACT OF THE DISCLOSURE

A binary sequence detector is disclosed which is used to detect an $n$ bit sequence, representable by $n$ subsequences, each of R bits. The detector includes R memory elements. Each bit of the $n$ bit sequence is associated with one of the R-bit subsequences. To detect the first bit in the sequence, the R memory elements store a subsequence, associated with the first bit. Then, as each successive bit is received, logic circuitry, forming part of the detector, is used to modify the subsequence stored in the memory elements. When the subsequence associated with the $(n-1)$th bit is stored in the R memory elements and the $n$th bit is received by the logic circuitry, an output is provided by the logic circuitry, indicating the detection of the sequence.

The invention described herein was made in the performance of work under a NASA contract and is subject to the provisions of Section 305 of the National Aeronautics and Space Act of 1958, Public Law 85-568 (72 Stat. 435; 42 USC 2457).

This invention relates to detection circuitry and, more particularly, to a binary sequence detector.

The techniques of generating binary sequences, extensively used in data communications, are well known. Generally, such sequences are inserted at the beginning or end of a data message or portion thereof, which is communicated between two sources, such as between a ground data processor and a spacecraft. The function of the sequences is to indicate the beginning or end of each block of data, within a serialized or bit by bit data stream.

In order to sense the sequential arrival of a binary sequence in the data stream, a detector is required to recognize or detect the particular multibit sequence, which may be thought of as comprising N bits. A prior art detector for such purposes, generally comprises N—1 memory elements interconnected with logic or decisional elements so that, if the bits of the sequence are properly stored in the various memory elements, upon the entry or arrival of the Nth or last bit of the sequence, the detector provides an output signal. This signal indicates the detection of the sequence, and thereby indicates the beginning or end of a block of data. Though such detectors operate with various degrees of success, they tend to become quite complex and expensive, when the value of N, that is the number of bits in the sequence, is large. For example, a detector capable of detecting a thirty-one bit binary sequence, often used in space exploration and data communication, requires thirty memory elements, in addition to the logic circuitry. Such a detector is quite expensive and complex.

Accordingly, it is an object of the present invention to provide a new improved binary sequence detector.

Another object is to provide a binary sequence detector which is simpler and less expensive than prior art detectors capable of detecting the same N bit sequence.

A further object is the provision of a detector comprising a fewer number of memory elements than comparable detectors.

Still a further object is the provision of a binary sequence detector for providing an output signal, indicating the reception of an N bit binary sequence in a serialized data stream, with the detector including a minimum number of memory elements.

These and other objects of the invention are achieved by providing a detector, built on the basis of the known properties of an N bit binary sequence which is characterizable as consisting of a binary N, R ring sequence. The letter N represents the number of bits in the binary sequence, while the letter R is a fixed number of consecutive bits in each of the N distinct subsequences comprising the ring sequence. In the detector of the present invention, the number of memory elements is equal to R, rather than being equal to N—1 as in prior art detectors. As the value of N increases, the relative difference between N and R increases, so that the reduction in the number of memory elements, required in the present detector, becomes more significant.

The N subsequences of the ring sequence are used to define N states of the R memory elements of the detector. An initial state is chosen for the detector from the ordered subsequence of the binary N, R ring sequence. The detector assumes successive states, represented by successive subsequences in the ring sequence, as each bit of the N bit sequence is received from the serialized data stream. Thus, once an assignment is made for the initial state, which the detector assumes, the state assignment is complete, in that the detector automatically switches to a succeeding state when the proper bit in the N bit sequence is received. Sensing the bit received and the state of the detector is accomplished by logic circuitry or decisional elements, which control the subsequent state of the detector by the proper setting of the binary memory elements thereof. As will be explained hereafter in detail, the complexity of the required logic circuitry may be minimized by the proper choice of the initial state of the detector. In a detector of R memory elements, there are R—1 subsequences which can be chosen as the initial state so that the logic circuitry is of reasonable complexity.

The invention will best be understood from the following description when read in connection with the accompanying drawings, in which:

FIGURE 1 is a chart of a specific nine bit sequence shown as a ring sequence of nine, four bit subsequences;

FIGURE 2 is a general block diagram of the detector of the invention;

FIGURE 3 is a complete block diagram of a detector in accordance with the teachings of the invention for detecting the nine bit sequence diagrammed in FIGURE 1;

FIGURE 4 is a chart useful in formulating the logical operations to be performed by the detector of FIGURE 3;

FIGURE 5 is a chart of a 21-bit sequence arranged as a ring sequence;

FIGURE 6 is a chart similar to that shown in FIGURE 3, but one related to the ring sequence of FIGURE 5.

Figure 7:
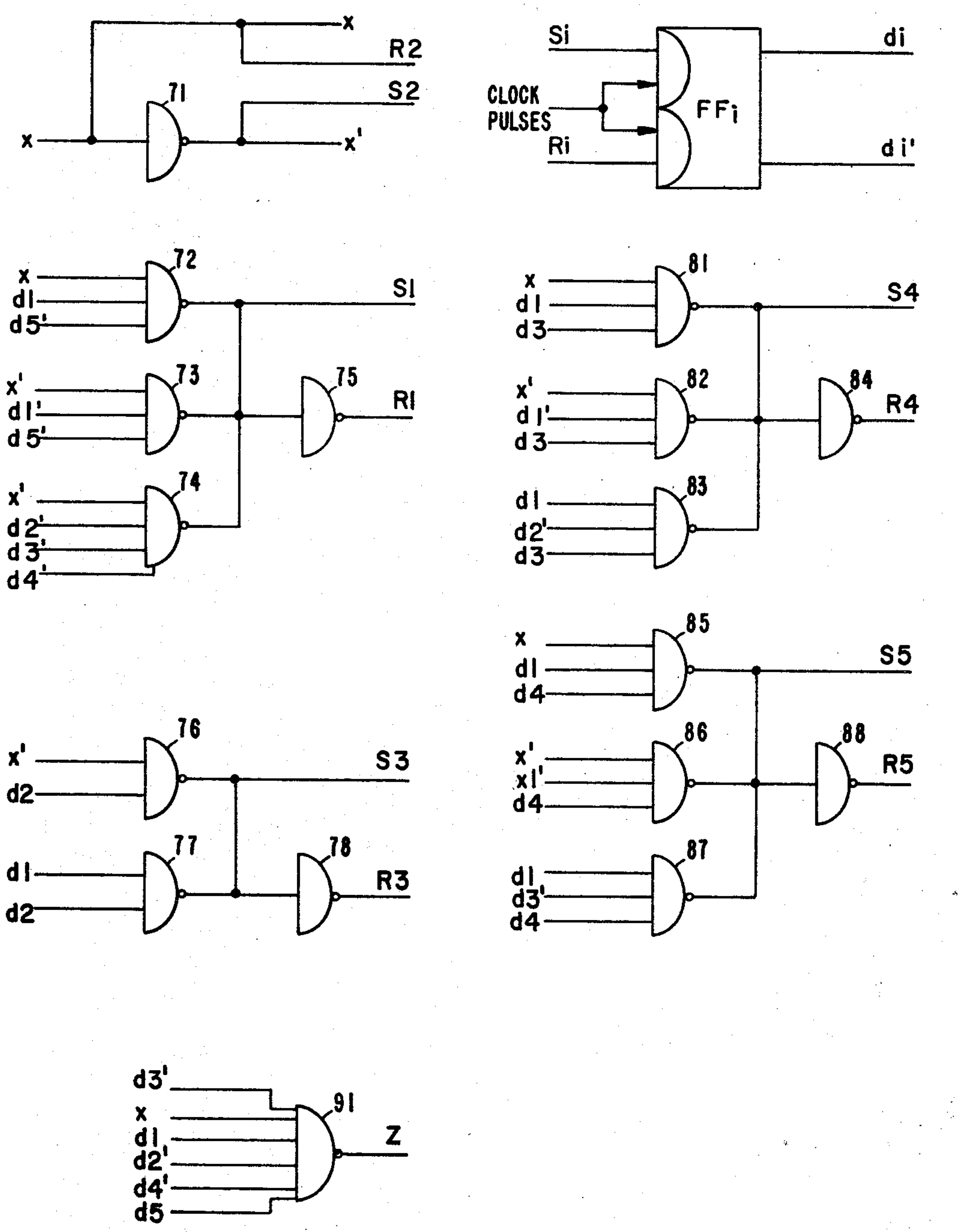
FIGURE 7 is a block diagram of a detector capable of detecting the 21-bit sequence shown in FIGURE 5 with only five memory elements.

The teachings of the invention may best be explained in conjunction with specific examples. Let it be assumed that a binary sequence 010010111, serially provided in a stream of data, is to be detected. Reading from right to left, the binary "1" is the first bit of the nine bit sequence (i.e. $N=9$), which ends with the last binary "0." As should be appreciated by those familiar with the art, herebefore, such a sequence is generally detectable by a detector comprising at least eight (8=9−1) memory elements and associated logic circuits or elements. However, in accordance with the teachings of the present invention, such a nine-bit sequence is detectable with a detector which includes a number of elements equal to the number of bits in each of N subsequences into which the nine-bit sequence can be divided.

As is known, the nine-bit sequence may be converted into a ring sequence of N subsequences, each of four bits. The bit length of each subsequence is selected so that each subsequence is distinct. In accordance with the foregoing definitions, $R=4$. Such a ring sequence is diagrammed in FIGURE 1 to which reference is made herein. Therein, rows R1 through R9 represent various successive subsequences and columns C1 through C4, the four bits in each subsequence. Also, in FIGURE 1, the bits on the column X represent the bits of the N bit sequence, written from top to bottom.

In accordance with the teachings of the present invention, the binary sequence detector comprises R memory elements and logic circuitry which senses the state of the R memory elements and the serially supplied input bit, hereafter designated as $x$ corresponding to column X. The memory elements are controlled to store an initial state which is one of the N subsequences. Then, as each bit in the binary sequence, hereafter also referred to as a sequence bit, is received in proper order, the logic circuitry controls the memory elements to store the next state, represented by the next successive subsequence in the ring sequence, to await the arrival of the next sequence bit. Only when all the sequence bits are received in the proper order, does the detector advance through all the N states or subsequences to provide an output signal, indicating the detection of the sequence.

Reference is now made to FIGURE 2 which is a general block diagram of the binary sequence detector. It is shown including logic circuitry 20 responsive to sequence bits serially supplied thereto, bit by bit, from a data stream (not shown). The logic circuitry 20 is coupled to a memory unit 30 which includes R memory elements, where R represents the number of bits in each of the subsequences into which the main binary sequence may be divided. The outputs of the various memory elements in unit 30 are coupled to logic circuitry 20. Only when the sequence bits arrive in the proper order are the memory elements in unit 30 successively controlled to store successive subsequences of the sequence ring, at the end of which the logic circuitry 20 provides an output signal on an output line 21 to indicate the proper detection of the sequence.

For example, to detect the nine-bit sequence, hereinbefore referred to, the memory unit 30 includes four memory elements, since the sequence may be divided into nine four-bit subsequences, as diagrammed in chart form in FIGURE 1. The elements may initially be controlled to store an initial state represented by any one of the nine subsequences. Then as each of the sequence bits, starting with the first binary "1" is received by logic circuitry 20, the memory elements are controlled to store a succeeding state, represented by a succeeding subsequence. Only after the elements have successively stored the various subsequences, and a binary "0," such as diagrammed in FIGURE 1 in row R9 and column X, is received, does logic circuitry 20 provide an output signal to indicate the proper reception of the sequence.

Although, any one of the subsequences may be chosen to represent the initial state, it has been found that out of the N subsequences, there are R−1 subsequences, any one of which when chosen may result in a logic circuitry of relatively limited complexity. Referring again to FIGURE 1, let it be assumed that the bits diagrammed in columns C1 through C4 represent the binary states of four memory elements D1 through D4 respectively, which are included in memory unit 30. In accordance with the teachings of the present invention, the R−1 subsequences which are preferably chosen as the sequences to represent the initial state, are those which will result in the tracking of the nine-bit binary sequence by one of the memory elements D2 through D4. For example, as seen from FIGURE 1, the bits diagrammed in columns X and C4 are identical, starting with the first binary "1" bit and ending with the last binary "0" bit. Therefore, in accordance with the teachings of the present invention, the last subsequence, diagrammed in row R9 is assumed to be one of the R−1 preferred subsequences, since if chosen, as each of the sequence bits (column X) is received, the memory element D4 is set to a binary value corresponding to the particular binary bit received.

By observing column C2, it is seen that starting with row R8 and continuing with rows R9 and rows R1 through R7, the bits therein are analogous to those of the nine bit sequence. Thus the preceding subsequence, diagrammed in row R7 is another of the preferred subsequences for representing an initial state. By storing in the memory elements in memory unit 30 the initial state, represented by 1010 (reading from left to right), the second memory element D2 will track the input sequence bit. In the example, in conjunction with FIGURE 1, the third preferred subsequence for an initial state is that diagrammed in row R8, represented by 1101 whereby the third memory element D3 will track the input binary sequence.

For a complete description of the detector for detecting the nine bit binary sequence herebefore defined, reference is made to FIGURES 3 and 4. FIGURE 3 is a complete block diagram of the detector, while FIGURE 4 is a chart useful in explaining the operation thereof. In FIGURE 4, D1 through D4 represent the four memory elements included in memory unit 30. Each of the memory elements is a flip-flop, also referred to as RS (reset-set) flip-flop. Each memory element or flip-flop has set and reset input lines designated S and R, respectively. The flip-flop also has two output lines designated $d$ and $d'$ with the respective numerical designation. The $d$ and $d'$ output lines are sometimes referred to as the assertion and negation outputs. To set the flip-flop to a binary "1" on its assertion ($d$) output, a binary "1" and a binary "0" are supplied to input lines R and S, respectively during an appropriate switching interval, controlled by timing pulses which are not shown in FIGURE 4, in order to simplify the diagram.

In FIGURE 4 in rows R1 through R9, column X is charted, the nine bit sequence starting with the first binary "1" and ending with the binary "0." The columns headed $d1$, $d2$, $d3$ and $d4$ are used to chart the outputs of the four memory elements D1 through D4 respectively which are supplied to the logic circuitry 20 to represent a state as designated in the column headed "Present State." Then on the basis of the incoming sequence bit and the present state, the logic circuitry controls the memory elements to store one of the nine states which are represented by one of the subsequences. These are charted in the columns headed D1 through D4, with the column headed "Next State," indicating the state represented by the subsequence stored in the memory elements.

As herebefore indicated, the subsequence 1010 shown in row R7 of FIGURE 1 is one of the preferred R–1 subsequences since, if chosen and the proper sequence is received, the memory element D2 will track the incoming sequence as seen from rows R8, R9 and R1 through R7 in column C2. In the chart of FIGURE 4, it is assumed that the memory elements D1 through D4 store the initial state 1 by storing the subsequence 1010 as shown in row R1, columns $d1$, $d2$, $d3$ and $d4$ respectively. Then when the first binary 1 is received (R1, X), the elements are controlled to represent the next state 2 by storing the next subsequence in the ring sequence as shown in row R8 of FIGURE 1. That is, the elements are controlled to store 1101, charted in row R1, columns D1–D4. During the next bit interval, the second state (1101) is supplied to the logic circuitry as shown in row R2 of FIGURE 4 so that when a "1" is received (R2, X) the elements are controlled to represent or store state 3 (1110) which is the next subsequence in the ring sequence (FIGURE 1, row R9). This process continues with the state or subsequence stored in the memory elements being supplied to the logic circuitry so that when the proper bit in the sequence is received, the memory elements are controlled to store the next state or next subsequence in the ring sequence. Then when the last state or subsequence, i.e. 0100, is supplied to the logic circuitry (FIGURE 4, row R9) and the incoming bit is the last of the binary sequence, i.e. the binary "0," the memory elements again store the initial state or first subsequence 1010 and the logic circuitry supplies an output signal, indicating that the proper sequence has been sensed.

If however the bit received does not seem to be in the proper order, the logic circuitry controls the elements to store a state or a subsequence which depends on the particular relationship of the received bit and the previously received bits. For example, let it be assumed that the memory unit 30 stores the first or initial state, represented by 1010 in FIGURE 5, row R10 and the received bit is a "0" rather than a binary "1." Then, since the sequence must start with a binary "1," the received "0" cannot be the first bit, and therefore the memory elements remain storing the state 1 represented by 1010 as shown in row R10, columns D1 through D4. Similarly, when the state of the memory unit is 2 as represented in row R11 and the incoming bit is a "0," the unit is controlled to store state 1, since state 2 indicates that the previous bit was a binary "1," however the present "0" cannot form together with the previous binary "1" the beginning of the sequence since the sequence starts with three successive "1's." Also, when the unit is in state 3 (row R12), indicating that the two previous bits were "1's" and the incoming bit it a "0," the unit is controlled to store state 1 since three consecutive "1's" are required. On the other hand, when the memory unit is in state 4, represented by 0111 (row R13) which indicates that the prior three bits received were "1's" when the next bit is a "1" rather than "0," the unit is not controlled to store state 1. Rather, it is energized to store state 4 since the present "1" and the two prior consecutive "1's" may be the first three "1's" of the sequence. Each of the other states which is stored in the memory unit as a function of the previous state and the incoming bit is charted in FIGURE 5 in one of rows R14 through R18.

Summarizing the foregoing description, the novel detector of the present invention for detecting an N-bit binary sequence which is divisible into a ring sequence of N, R bit distinct sequences, consists of R memory elements forming a memory unit which is controlled to store an initial state, represented by one of the subsequences. As each bit of the sequence is received, the memory unit is advanced to a succeeding subsequence of the ring sequence. Then, when the unit stores the last subsequence and the last sequence bit is received, the detector provides an output signal, indicating the detection of the sequence. The storing in the memory unit of the various states is accomplished by logic circuitry. As previously indicated, it has been found that the logic circuitry may be greatly simplified, if one of the memory elements, except for the one storing the latest bit of each subsequence, stores a bit corresponding to the input bit. For example, as may be seen from FIGURE 4, the subsequence 1010 has been selected as the initial state so that memory element D2 tracks the incoming or input bit. This may be seen by comparing the bits in columns X and D2 in rows R1 through R18. The other two preferred subsequences for the initial state are 1101 and 1110, which would have resulted in elements D3 and D4, respectively, tracking the incoming bit.

As should be appreciated by those familiar with the art, the logic function of the logic circuitry may be expressed in the form of logic equations from which the structure of the circuitry may be determined. For example, the binary relationships charted in FIGURE 4 may be defined by the following equations:

$$D1' = xd2'd4 + xd2d3 + x'd1'd3'd4 \quad (1)$$

$$D2 = x \quad (2)$$

$$D3 = x'd1 + d2 \quad (3)$$

$$D4' = x'd1 + d3' \quad (4)$$

$$Z = x'd1'd2d3'd4' \quad (5)$$

As used in conventional logic equations, the symbol ′ (prime) and + denote complementation and logical addition, i.e. the OR function while adjacent variables such as $d1d2$ denote logical multiplication or the AND function. In Equation 5, Z represents a binary "0" output signal only when the incoming bit X is 0 and the present state is 0100, i.e. state 9.

In the embodiment of the invention diagrammed in FIGURE 3, the foregoing logical equations are performed by a plurality of NAND gates, which are supplied with the outputs of the four memory elements D1–D4, as well as the input bit $x$ and its complement $x'$. The outputs of some of the gates are connected to the inputs of the memory elements. As previously indicated, the memory elements being RS flip-flops, are supplied with two inputs. To set the element to a binary "1," the R and S inputs are a binary "1" and a binary "0" respectively. Thus in the foregoing equations, D1′, D2, D3 and D4′ may be represented by S1, R2, R3 and S4 which indicate the required inputs to the S inputs of D1 and D4 and the R inputs of D2 and D3 respectively. R1, S2, S3 and R4 are simply the complements of S1, R2, R3 and S4.

As may be seen from FIGURE 3, the input S1 is generated by four NAND gates 41–44. NAND gates 41, 42 and 43 provide the complements of the terms on the right-hand side of Equation 1. Their outputs are ANDed as indicated by junction point 45 with the resultant signal inverted by NAND gate 44 which operates as an inverter. The junction point 45 and the output of gate 44 are shown connected to the R1 and S1 inputs of D1. The binary signals thereat may be expressed as $$R1 = (xd2'd4 + xd2d3 + x'd1'd3'd4)' \quad (6)$$

and $$S1 = xd2'd4 + xd2d3 + x'd1'd3'd4 \quad (7)$$

Similarly, NAND gates 47, 48 and 49 are used to provide the binary signals for the S3 and R3 inputs of D3. The output of gate 47 is $(x'd1)'$, which, when ANDed together with $d2'$ by junction point 51, result in $(x'd1+d2)'$. This term is inverted by gate 49 to provide the term $x'd1+d2$, supplied to R3 which is the same as D3 expressed in Equation 3.

The input signals for D4 are provided by NAND gates 53, 54 and 55, with the outputs of gates 53, 54 providing the terms $(x'd1)'$ and $(d3')'$ respectively being ANDed as indicated by junction point 56 to provide the term $(x'd1+d3')'$, which is inverted by gate 55, operating as an inverter. Since element D2 tracks the input bit $x$, the input sigals thereto are supplied from the input line representing input bit $x$ and the output $x'$ of a NAND gate 57 operating as an inverter. The output signal Z is supplied by a NAND gate 58 providing a binary "0" output signal only when all its inputs are binary "1's."

Although the memory unit and logic circuitry has been described in conjunction with RS flip-flops, serving as memory elements and NAND gates, other memory and logical elements may be employed to construct the detector in accordance with the foregoing description. It should be apparent to those familiar with the art that the particular interconnection of the various logical elements depends on the elements used, the only requirement being that the elements generate terms or binary signals in accordance with the foregoing equations.

Although herebefore, the invention has been explained in conjunction with a binary sequence detector for detecting a nine bit sequence, it should be appreciated that the teachings may be employed to provide a detector capable of detecting a given binary sequence of any number of bits. The steps followed in designing the detector are the same, regardless of the sequence or the number of bits in the sequence to be detected. These steps may be summarized in conjunction with another example. Let it be assumed that a 21-bit sequence such as

100011001010111110000 reading from right to left is to be detected. The first step is to determine the ring sequence for the 21-bit sequence. The minimum number of bits in each subsequence, i.e. $R_{min}$ is $1+[\log_2 N]$ where the bracketed term indicates the nearest integer which is less than $\log_2 N$. With $N=21$, $R_{min}=1+4=5$. R may have to be greater than $R_{min}$ to insure that each subsequence is distinct from any of the others. Once R is determined, the ring sequence is charted, forming 21 5-bit subsequences as shown in FIGURE 5, to which reference is made herein. Therein, the five columns representing the five bits of each subsequence are designated D1–D5 to correspond to the five memory elements needed to store each subsequence. Also the column X represents the input sequence to be detected written from top to bottom as is the case in FIGURE 1.

Thereafter, the subsequence to represent the initial state is assigned. Assuming that D2 is chosen to track the input bit, it is seen from FIGURE 6 that starting with the subsequence 00100, the bit in D2 corresponds to the input bit. Therefore the preceding subsequence 01000 is chosen as state 1 and the succeeding subsequences are designated by successive state numbers. After the state assignment is performed, a chart, such as shown in FIGURE 6, is prepared, comprising sections A and B. Section A includes 12 columns C1–C12 and section B includes columns C13–C23. It is accomplished by charting the various ring sequence subsequences, starting with the initial state 01000 (columns C2–C6) as well as charting the 21-bit sequence starting from top to bottom (column C1) headed by the letter X. Column C7 headed "Present State" is used to indicate the state number associated with each subsequence. In columns C8 through C12, headed D1 through D5 are charted the subsequences or states stored in the memory elements as a function of their prior state and the incoming bit *x*, which is assumed to arrive in the proper order in the sequence. Section A is similar to rows R1 through R9 of FIGURE 3, while section B is similar to rows R10 through R18. In Columns C14 through C18 are charted the successive subsequences as in columns C2–C6. However, the complements of the bits in column C1 are charted in column C13. The states stored in the memory elements as a function of the previous states (columns C14–C18) and the wrong incoming bits (C13) are charted in columns C19 through C23. The bottom portions of the sections A and B in FIGURE 6 represent unused states.

The charted bit relationships are then expressed in the form of logical equations from which the structure of the logical circuitry is determined. Various logic design aids, such as Karnaugh charts, may be utilized for such purposes. The chart of FIGURE 6 may be expressed by the following logical equations:

$$D1=xd1d5'+x'd1'd5+x'd2'd3'd4' \quad (8)$$

$$D2=x \quad (9)$$

$$D3=(d2'+xd1')' \quad (10)$$

$$D4=xd1d3+x'd1'd3+d1d2'd3 \quad (11)$$

$$D5=xd1d4+x'd1'd4+d1d3'd4 \quad (12)$$

$$Z=xd1d2'd3'd4'd5 \quad (13)$$

The implementation of the foregoing equations is diagrammed in block form in FIGURE 7. Therein, flip-flop $FF_i$ represents each of the five memory elements, *i* representing 1 through 5. The other logic elements shown therein are NAND gates. Gate 71 responding to the incoming bit *x* operates as an inverter providing the *x* complement *x'*. The *x* and *x'* signals are supplied as inputs to the reset and set inputs R2 and S2 respectively of memory element D2, since as herebefore assumed, the element tracks the incoming bit. NAND gates 72–75 are the implementation of Equation 8, while NAND gates 76, 77 and 78 implement Equation 9. Similarly, the implementation of Equation 10 is accomplished by gates 81–84 and that of Equation 11 by gates of 85–88. The output signal Z is produced by NAND gate 91. The output of gate 91 is a binary "0" only when the incoming bit is a binary "1," being the last bit of the sequence and the state in the memory elements is the last subsequence 10001, shown in the last row in columns C2–C6 (FIGURE 6).

From the foregoing, it should thus be appreciated that in accordance with the teachings of the invention, the 21-bit sequence, herebefore described, is detectable in a detector including only five memory elements, whereas prior art detectors would require twenty memory elements. The minimum number of elements needed is $1+[\log_2 N]$, where N is the number of bits in the sequence to be detected, and the bracketed term is the closest integer less than $\log_2 N$.

It should further be appreciated that the detector may be employed whenever an N bit binary sequence is to be detected whether or not the sequence is used to separate data blocks in a serialized data stream. Thus, the detector may be used in any data processor in which an output signal is desired to indicate a certain sequence of binary bits. Other applications of the detector may include its use as an electronic lock. In such an application, the binary "1's" and "0's" of the sequence may be supplied from one or more sources. By supplying the bits in the sequence bit by bit, the detector will advance through its states so that when the last bit is received, a locking or unlocking signal is provided.

There has accordingly been shown and described herein a novel binary sequence detector.

What is claimed is:

1. A system for detecting a predetermined sequence of binary bits in a stream of bits supplied thereto bit by bit from a binary bit source, said predetermined sequence being a ring sequence definable by a group of distinct successive subsequences forming a ring sequence, the number of bits in each subsequence being less than the number of bits in said predetermined sequence, each subsequence being associated with a bit of said predetermined sequence, the system comprising:

a plurality of storing elements equal in number to the number of bits in each subsequence for initially storing therein a selected one of said subsequences associated with the first bit of said predetermined sequence; and logic means associated with said plurality of elements and responsive to each bit supplied from said source, for storing a subsequence in said storing means which is a function of the bit supplied from said source and the subsequence previously stored in said storing means, said logic means further including means for providing an output signal indicative of the detection of said sequence when the bit supplied from said source corresponds to the last bit of said sequence and the subsequence stored in said storing means is one associated with the next to last sequence bit.

2. The system defined in claim 1 wherein said logic means includes gating means responsive to the bit from said source for storing said bit as part of a subsequence in one of said memory elements.

3. The system defined in claim 2 wherein said plurality of memory elements comprise $r$ flip-flops, each having two stable states of operation and said logic means comprises a plurality of NAND gates, the flip-flop storing the bit from said source being other than the flip-flop storing the $r$th bit in said sequence when the subsequence in said flip-flop comprises the first $r$ bits of said sequence.

4. A system for detecting a predetermined sequence of $n$ binary bits, received from a source of binary bits, bit by bit, said predetermined sequence being definable by a group of $n$ distinct successive subsequences forming a ring sequence, each subsequence comprising $r$ bits, any one of said $n$ subsequences being associatable with the first bit of said sequence with each successive subsequence being associatable with successive bits in said sequence, the system comprising:

$r$ memory elements for storing any one of said subsequences; and logic means coupled to said memory elements responsive to the subsequence stored therein associated with one of said bits in said $n$ bit sequence and the bit received from said source for storing in said memory elements a subsequence which is associated with a bit in said sequence which is a function of the last and previously received bits from said source, said logic means including means for providing an output signal indicative of the detection of said predetermined $n$ bit sequence when the bit received from said source corresponds to the last bit of said sequence and the subsequence in said storing means is one associated with said next to last sequence bit.

5. The system defined in claim 4 wherein $$r \geq 1 + [\log_2 n]$$

where the bracketed term $[\log_2 n]$ is the nearest integer less than $\log_2 n$, and wherein one of $r-1$ subsequences is associatable with the first bit of said predetermined sequence, whereby the bit stored in one of said memory elements corresponds to the bit received from said source.

6. The system defined in claim 5 wherein said $r$ memory elements are designatable $M_1$ through $M_r$ and a subsequence comprising the first $r$ bits of said $n$ bit subsequence associated with a particular bit in said sequence is storable in said $M_1$ through $M_r$ elements with the first bit in said element $M_r$ and the $r$th bit in element $M_1$, the bit stored in one of said elements other than element $M_1$ corresponding to the bit received from said source.

7. The system defined in claim 6 wherein the bit stored in element $M_2$ corresponds to the bit received from said source.

8. A system for detecting an $n$ bit binary sequence from a source of bits, received bit by bit, said sequence designated $b_n, b_{n-1} \ldots b_{r+1}, b_r, b_{r-1} \ldots b_2, b_1$, where $b_1$ is the first bit, being definable by $n$ distinct successive subsequences designated $b_r \ldots b_1$, $b_{r+1} \ldots b_2 \ldots b_n \ldots b_{n-(r+1)} \ldots b_{r-1} \ldots b_n$, each of length $r$ bits, each subsequence being associated with one of said sequence bits, the system comprising:

$r$ flip-flops for storing one of said subsequences associated with bit $b_1$; and logic means responsive to each successive bit received from said source and the subsequence in said flip-flops for advancing said flip-flops to store successive subsequences therein, whereby the subsequence stored in said flip-flops is indicative of the portion of said $n$ bit sequence already received which precedes the bit associated with the stored subsequence, said logic means further including output means for providing an output signal indicative of the detection of the sequence when the bit received from said source corresponds to bit $b_n$ and the subsequence in said flip-flops is the one associated with bit $b_{n-1}$.

References Cited

UNITED STATES PATENTS 3,391,272 7/1968 Drew ------------- 235—61.7

EUGENE G. BOTZ, Primary Examiner

R. S. DILDINE, Assistant Examiner

U.S. Cl. X.R.

178—69.5; 235—61.7; 340—146.1, 167, 204